Jan. 17, 1950     J. IDRAC     2,494,877
ICING INDICATOR

Filed Dec. 30, 1946     4 Sheets-Sheet 1

Inventor
Jean Idrac
by H.B.Willson &Co.
atty.

Jan. 17, 1950 J. IDRAC 2,494,877
ICING INDICATOR
Filed Dec. 30, 1946 4 Sheets-Sheet 4

Inventor
Jean Idrac
BY
Attorneys

Patented Jan. 17, 1950

2,494,877

UNITED STATES PATENT OFFICE 2,494,877
ICING INDICATOR

Jean Idrac, Paris, France, assignor to Groupement Français pour le Developpement des Recherches Aeronautiques, Paris, France, an endowed institution of France Application December 30, 1946, Serial No. 719,295
In France December 31, 1945

6 Claims. (Cl. 177—311)

This invention has for its object a method and a device for the detection of icing, which are characterized notably by the use of such a member as a finger or feeler adapted periodically to sweep the surface to be scanned and whose blocking is indicative of the presence of an ice layer.

With this end in view, in a first embodiment of the invention, avail is made of an electromagnet which is energized periodically by a timing motor, and of a spring connection between a primary shaft that carries an armature oscillated by the impulses from said electromagnet and a secondary shaft that carries the feeler.

Suitable electric means are provided which permanently urge the feeler against the blocking effect of the ice layer as soon as same has formed, by which all the warning, measuring and counteracting means are set into action and by which said means are made inoperative as soon as the action of the feeler is not interfered with.

A preferred example of this first embodiment will be described hereinafter, reference being had to the appended drawings in which.

Figure 1:
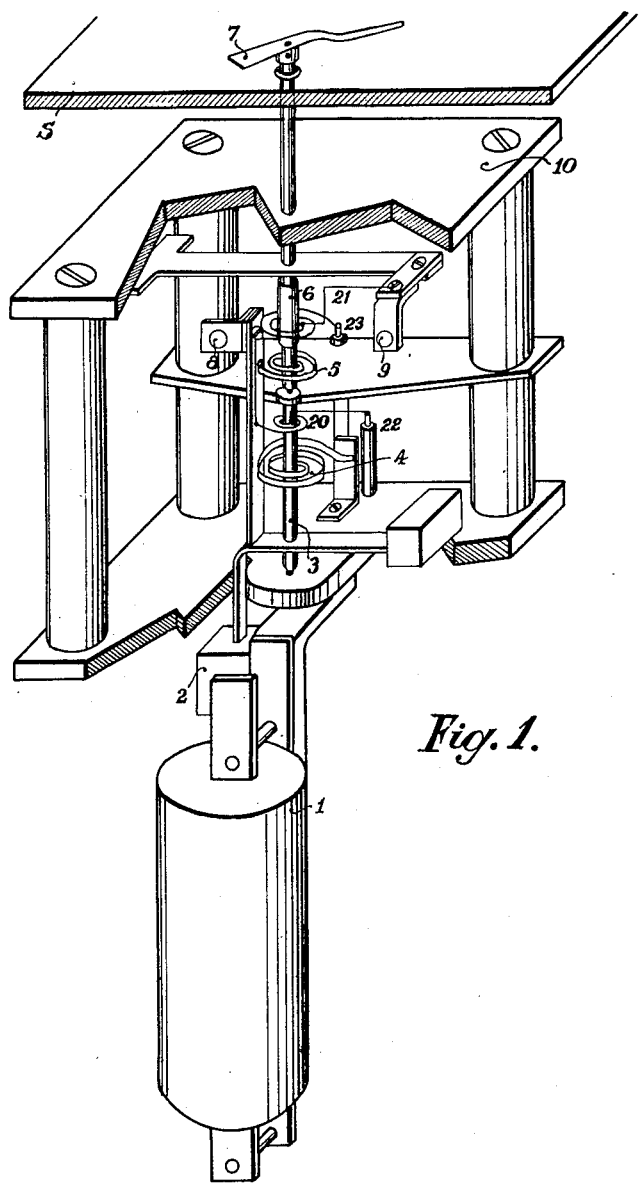
Figure 1 is a perspective view of the mechanical section of the apparatus, with its casing partly broken away.
Figure 2:
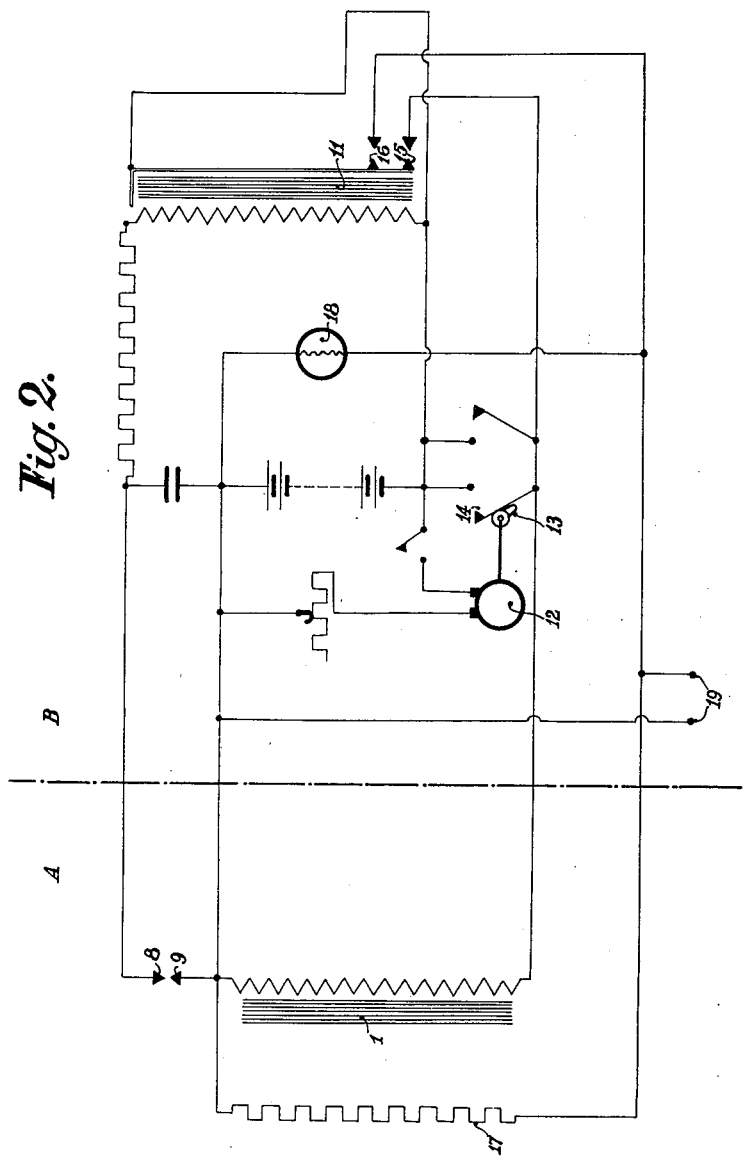
Figure 2 is the wiring diagram of the whole apparatus.

The indicating device illustrated in Fig. 1 is secured to the lower side of the surface S to be scanned, only the feeler projecting above the said surface. The said device is connected electrically with the control relay for the means provided.

This portion of the apparatus may occupy a volume of only a few cubic centimeters. It is constituted by an electromagnet 1 impressed with a voltage of e. g. 24 v. and adapted thereby to attract an armature 2 swingably mounted on a so-called primary shaft 3. Whenever the current is cut out, the armature will be returned to its original position by a spiral spring 4.

The primary shaft is connected by a spring 5 with an additional shaft 6 coaxial therewith. Said so-called secondary shaft is fitted at the free end thereof with a finger or feeler 7 swept over the surface S on which the formation of ice is to be ascertained.

Both the primary and the secondary shafts carry a platinized contact 8 and 9 respectively. The electric current is carried to the two movable contacts from terminals 22 and 23 by conductor wires 20 and 21 which have spiral portions surrounding the two shafts.

For the sake of clearness in their representation the arm rigid with the feeler and carrying the contact 9 is shown in a position displaced counter-clockwise by 120° from its position of rest as seen from the feeler side.

Except the feeler and the electromagnet, the whole apparatus described is shielded from external interferences by a closed casing 10.

Electrically connected with the indicating device is a board on which apparatus are grouped which are adapted to control its operation and to receive icing indications therefrom which are translated by receivers on said board; it notably comprises an electric timing motor by which electric impulses are sent to the indicating device.

Portion A of the diagram 2 relates to the indicating device, and portion B to the circuits in the control board.

The coil of the indicating device is energized periodically with a voltage of e. g. 24 v. whenever the contacts 14 are closed by the action of a cam 13 which is actuated by the timing motor 12.

Following the engagement of contacts 8 and 9 the relay 11 is energized and will in turn close the circuits for the measuring, warning and counteracting means provided. Thus, the contacts 15 are designed to close the circuit for the electromagnet of the indicating device, whose feeler is subjected to the permanent action of the spring 5 connecting the primary with the secondary shaft; similarly, contacts 16 are designed to close the circuits for the de-icing resistance 17, for the signal lamp 18 and further desirable circuits 19.

The apparatus thus constructed operates as follows:

As the primary shaft 3 is displaced by the action of an electric impulse the secondary shaft 6 is urged into similar rotation by the connecting spring 5. Contacts 8 and 9 will only be engaged with one another if the feeler is blocked in its position of rest by such a resistance as may result e. g. from icing.

In this case the relay 11 will be actuated, whereby the circuit for the warning means and the circuit for the electromagnet are closed, said electromagnet remaining energized as long as the feeler remains blocked.

Upon the feeler being cleared as a result of the ice layer melting or sublimating away, the contacts will be disengaged from each other by the action of the spring connecting the primary with the secondary shaft; the relay is restored to its initial position in which the electromagnet and the warning device are switched out and the armature is also returned to its initial position. The electromagnet is once again open to the impulses emitted by the timing motor at regular intervals and nothing happens in the circuits controlled by the relay as long as the feeler remains free to oscillate.

It should be understood, however, that this example is not limitative and that all mechanical or electrical modifications may be made therein.

For instance, it is possible to modify the elastic connection between the primary and the secondary shaft, to vary the character of the impulses, etc.

In a second embodiment of the invention avail is still made of an actuating timing electromagnet, but the apparatus comprises only one shaft on which the feeler and the armature are keyed.

Figure 4:
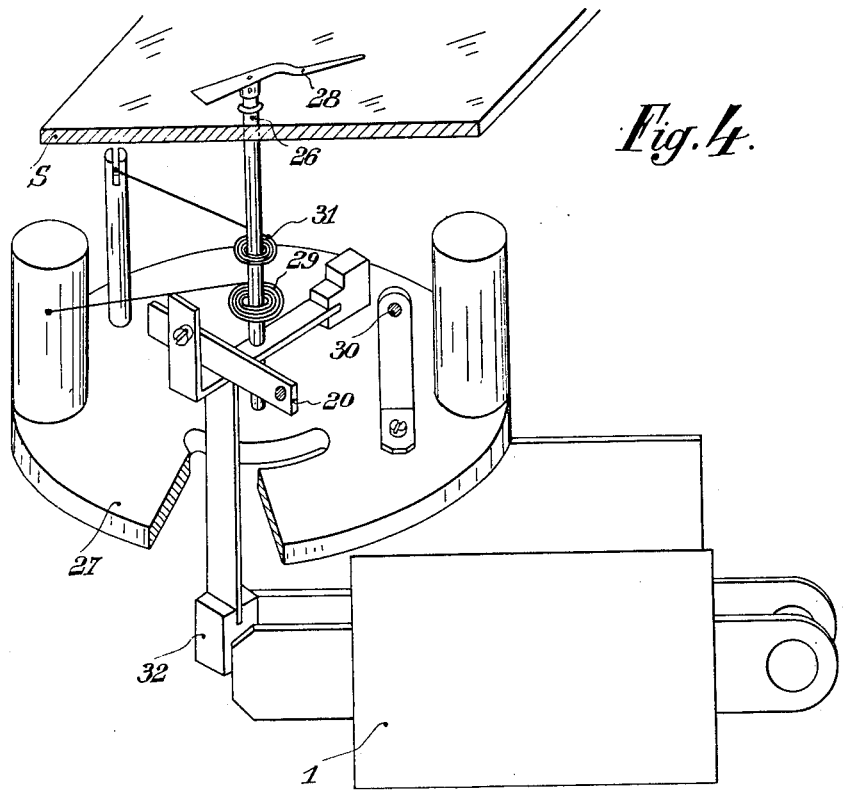
Fig. 4 is a view in perspective of the essential members of the feeler mechanism of a different construction from that shown in Fig. 1.
Figure 5:
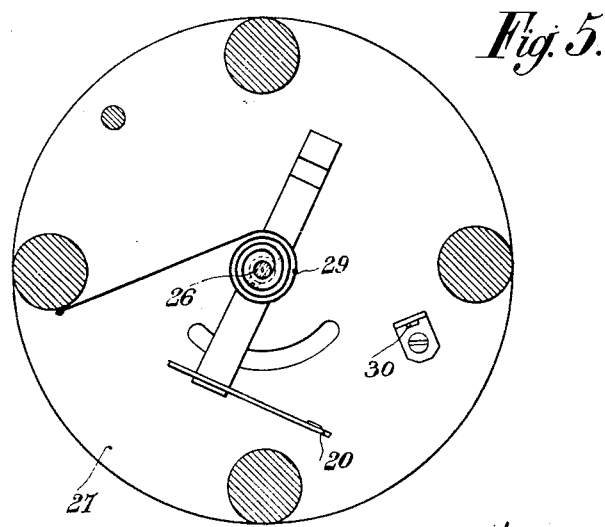
Fig. 5 is a horizontal section showing portions of structure of Fig. 4.

The feeler or indicating mechanism shown in Figs. 4 and 5 comprises a frame 27 disposed adjacent to a surface S which is to be controlled. A vertical axis or shaft 26 is mounted for oscillatory movement on the frame perpendicular to the surface S, and has fixed to its upper or outer end a feeler hand or arm 28 adapted to oscillate close to the upper or outer face of the surface S on which ice may form. By means of cross pieces the shaft carries a switch contact 20 and a pole-piece or armature 32 of an electro-magnet 1, these parts 20 and 32 oscillating with the shaft. Movable contact 20 coacts with a stationary switch contact 30 fixedly supported on frame 27. When the winding of the electro-magnet is energized it attracts the armature 32 to turn or rotate shaft 26 in one direction. The shaft is turned in the opposite direction by a coil spring 29 fixed at one end to the shaft and having its other end suitably fixed to the frame. Current may be conducted to the contact 20 by means of a coiled conductor 31, or with proper insulation, the spring 29 may be used for that purpose.

Figure 3:
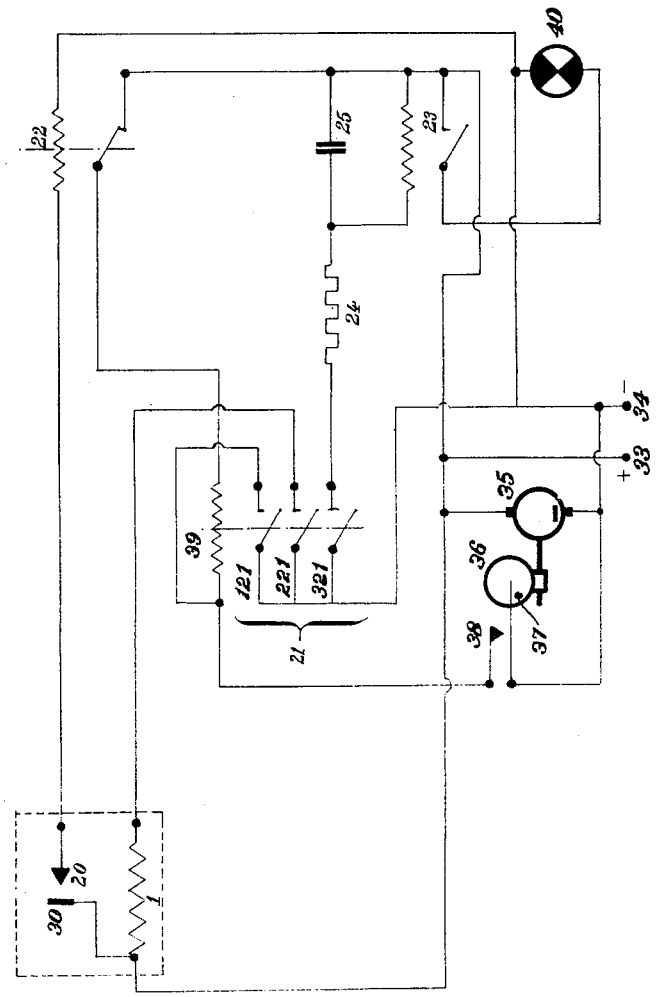
Fig. 3 is an electric wiring diagram of the icing indicator shown in Figs. 4 and 5.

Fig. 3 is an electric wiring diagram which shows diagrammatically within the dotted line rectangle parts of Figs. 3 and 4, that is, the winding 1 of the electro-magnet, the movable contact 20 and the fixed contact 30 of the switch, these contacts being separated as they would be when hoarfrost or ice on surface S blocks the movement of the feeler. The different circuits shown are supplied with a current or uniform or constant voltage and preferably from a single source, the positive and negative poles being designated by 33 and 34 respectively. 35 denotes a constant speed electric motor the shaft of which carries a worm in mesh with a rotatably mounted worm gear 36 having near its periphery a pin or other cam 37 to periodically open and close a make-and-brake switch 38.

The switch 38 is included in the circuit of winding 39 of a main relay 21 which is preferably a triple relay having three switches 121, 221 and 321, these being simultaneously closed when winding 39 is energized. In said circuit is also included the switch of an auxiliary relay 22 the winding of which is included in the circuit for the switch contacts 20, 30. The wiring is such that when switch 121 is closed current may pass directly through winding 39 from the source 33, 34. Switch 221 is included in the circuit of the electro-magnet 1 and hence the latter is energized and tends to move contact 20 toward contact 30 when the main relay is energized. Switch 321 is in a controlling circuit for the circuit of an electrical device 40 which may be an audible or visual signal or indicator or which may actuate or control some means for causing de-icing of the surface S. The circuit of the indicator device 40 includes the switch of a delayed-action relay 23, the winding of which is included in the circuit controlled by switch 321. 24 denotes a resistance in the last mentioned circuit and 25 a capacity or condenser.

If ice formation on the surface S stops the oscillation of the feeler hand 28 and shaft 26, the contacts 20, 30 cannot engage and no current can pass to the relay 22, the switch of which remains closed. Hence current can pass to the winding 39 of the triple relay and its three switches remain closed. As a result of the closing of switch 221 the current continues to pass to the electro-magnet 1 which continues to turn shaft 26 in the direction to cause contact 20 to engage contact 30, but the closing of that switch is made impossible by the ice formation on surface S. As a result of the closing of switch 321, the current passes through resistance 24 and charges condenser 25. As a result of the maintenance of the relay 21 in switch-closed position, the current after charging the condenser passes through the winding of relay 23 the switch of which closes the circuit of the indicator device 40.

After the ice formation has melted the switch contacts 20, 30 close through the action of the electro-magnet on the armature 32, thus causing the energizing of the relay 22. The functioning of the switch of this relay then opens the circuit of the winding 39 of the triple relay, the three switches of which then open. The opening of switch 321 causes the functioning of the indicator 40 to stop. The opening of switch 221 causes de-energizing of the winding of the electro-magnet, and permits shaft 26 to freely move under the action of its spring 29 to open the switch 20, 30.

The apparatus then operates normally as when no ice formation is on the surface S. At each closing of the switch 38 the triple relay closes and is held since the closing of switch 221 has the effect of energizing the winding 1 of the electro-magnet, the circuit including the contacts 20, 30 closing as a result of the action of the electro-magnet on the armature 32. The energizing of the winding of the relay 22 opens its switch and the current stops passing through the winding 39 of the triple relay, the three switches of which open. The energizing of the winding 39 of the triple relay 21 and of the winding of the electro-magnet 1 are thus stopped and the contacts 20, 30 open under the action of spring 29. Furthermore, between the closing and the opening of switch 321 there has passed, because of a suitable choice of the resistance 24 and the condenser 25, not enough time to permit the switch of the relay 23 through its closing to cause the indicator device 40 to be actuated.

This invention enables to develop a series of warning, indicating, heating switch-in apparatus for use on board of flying machines, since they are uninfluenced by accelerations or by the speed of the air that sweeps the surface on which the presence of ice is to be detected.

Moreover, all readings, recordings, automatic controls, may be made from a distance, since transmission is effected electrically; it is particularly convenient to transmit the indications from the apparatus by means of radioelectric waves.

These apparatus may be used simply to indicate the presence of ice or to set into action de-icing means on board of an airplane; they may also be made to indicate icing danger where the indicator is exposed to conditions which are more unfavourable than those to which the various parts of the airplane itself are subjected, and to set icing-preventing systems into operation beforehand.

They may also comprise electric circuits adapted to give the value of the electric current necessary to carry out the de-icing of a given area; in these circuits avail is made, e. g., of the rise in the temperature of a specially designed part whose temperature is ascertained by an electric method, or of a condenser the voltage at the terminals of which is measured by an electronic-tube voltmeter.

What I claim as my invention and desire to secure by Letters Patent is:

1. An electrically driven icing indicator comprising a fixed frame mounted adjacent to a surface to be controlled, an oscillatory shaft mounted on said frame perpendicular to said surface, a feeler hand fixed to said shaft to oscillate over said surface, a spiral spring between said frame and shaft for turning the latter in one direction, an electro-magnet and an oscillating armature therefor, said armature being fixedly connected to said shaft to turn it against the action of said spring when the said electro-magnet is energized, a switch including a fixed contact on said frame and a coacting movable contact carried by said shaft, an electrically-operated indicating device, a first circuit including the contacts of said switch, a second circuit including the winding of said electro-magnet, a third circuit including said indicating device, and means to intermittently and periodically energize the winding of said electro-magnet to alternately open and close said switch and to oscillate said shaft and its feeler hand during the time said surface is free from such ice formation as would stop the movement of said hand and suspend the periodic closing of said switch contacts, said means also closing the circuit of said indicating device a certain time after the movable contact of said switch is stopped by ice formation on said surface, said means further causing a continuing closure of the circuit through the winding of said electro-magnet to permit the contacts of said switch to close as soon as the ice formation holding said feeler hand melts.

2. The structure of claim 1 in which said means includes a control circuit for said indicating device, said control circuit including a resistance and a condenser in series, the indicating device being in shunt with said condenser.

3. An electrically driven icing indicator comprising a fixed frame mounted adjacent to a surface to be controlled, an oscillatory shaft mounted on said frame perpendicular to said surface, a feeler hand fixed to said shaft to oscillate over said surface, a spiral spring between said frame and shaft for turning the latter in one direction, an electro-magnet and an oscillating armature therefore, said armature being fixedly connected to said shaft to turn it against the action of said spring when the said electro-magnet is energized, a switch including a fixed contact on said frame and a coacting movable contact carried by said shaft, said electro-magnet when periodically energized causing alternate opening and closing of said switch and oscillation of said shaft and its feeler hand during the time said surface is free from such ice formation as would stop the movement of said hand and suspend the periodic closing of said switch contacts, an electrically-operated indicating device, a triple relay simultaneously opening and closing three switches, a second relay operating a single switch, a third relay operating a single switch, a first circuit to energize the winding of the electro-magnet and including one of the switches of said triple relay, a second circuit including the two contacts of said first mentioned switch and the winding of said second relay, a third circuit including said indicating device and the switch of said third relay, a fourth circuit intermittently and periodically energizing the winding of said triple relay and including the switch of said second relay, a fifth circuit including the winding of said third relay and another of the switches of said triple relay, the third switch of said triple relay being connected to energize the winding of said triple relay when said fourth circuit is broken by the opening of the switch of said second relay, the construction and arrangement of the parts being such that when the switches of the triple relay close the winding of that relay will be continuously energized, the winding of said electro-magnet will be continuously energized and said fifth circuit controlling the circuit of said indicating device will be closed, and means associated with said fifth circuit for causing a lag in the closing of the circuit of said indicating device.

4. The structure of claim 3 in which all of said circuits are fed by a single source of current of uniform voltage.

5. The structure of claim 3 in which said fourth circuit for operating said triple relay includes a switch periodically operated by a rotary cam driven by an electric motor of constant speed.

6. An electrically driven icing indicator comprising a fixed frame mounted adjacent to a surface to be controlled, an oscillatory shaft mounted on said frame perpendicular to said surface, a feeler hand fixed to said shaft to oscillate over said surface, spring means tending to rotate said shaft in one direction, an electro-magnet and an oscillating armature therefore, said armature being fixedly connected to said shaft to turn it against the action of said spring means when said electro-magnet is energized, a switch including a fixed contact on said frame and a coacting movable contact carried by said shaft, said electro-magnet when periodically energized causing alternate opening and closing of said switch and oscillation of said shaft and its feeler hand during the time said surface is free from such ice formation as would stop the movement of said hand and suspend the periodic closing of said switch contacts, an electrically operated indicating device, a delayed action relay for controlling said indicating device, a circuit for said switch including an auxiliary relay having a switch, a main relay for simultaneously operating a plurality of switches, a circuit for said electro-magnet including one of the switches of said main relay, a circuit for said main relay including the switch of said auxiliary relay and a motor-driven, periodically-actuated make-and-brake switch which periodically energizes said main relay when the switch of said auxiliary relay is closed, another of the switches of said main relay being connected to energize said main relay when the switch of said auxiliary relay is open, and a circuit for said delayed-action relay including still another switch of said main relay, the last mentioned switch when closed causing the actuation of said indicating device whenever ice formation on said surface stops said feeler hand and prevent said movable contact from closing said first mentioned switch.

JEAN IDRAC.

REFERENCES CITED

The following references are of record in the file of this patent:

UNITED STATES PATENTS

| Number | Name | Date |
| --- | --- | --- |
| 2,280,400 | Green | Apr. 21, 1942 |
| 2,423,687 | Davis et al. | July 8, 1947 |